(12) United States Patent
Salisbury

(10) Patent No.: US 10,415,672 B2
(45) Date of Patent: Sep. 17, 2019

(54) DRIVES WITH PARTIAL CYCLOID TEETH PROFILE

(71) Applicant: SRI International, Menlo Park, CA (US)

(72) Inventor: Curt Salisbury, San Ramon, CA (US)

(73) Assignee: SRI International, Menlo Park, CA (US)

( * ) Notice: Subject to any disclaimer, the term of this patent is extended or adjusted under 35 U.S.C. 154(b) by 42 days.

(21) Appl. No.: 15/568,585

(22) PCT Filed: Apr. 21, 2016

(86) PCT No.: PCT/US2016/028554
§ 371 (c)(1),
(2) Date: Oct. 23, 2017

(87) PCT Pub. No.: WO2016/172285
PCT Pub. Date: Oct. 27, 2016

(65) Prior Publication Data
US 2018/0156314 A1   Jun. 7, 2018

Related U.S. Application Data

(60) Provisional application No. 62/152,484, filed on Apr. 24, 2015.

(51) Int. Cl.
*F16H 1/32* (2006.01)
*F16H 55/08* (2006.01)

(52) U.S. Cl.
CPC ............. *F16H 1/32* (2013.01); *F16H 1/321* (2013.01); *F16H 55/08* (2013.01); *F16H 2001/325* (2013.01)

(58) Field of Classification Search
None
See application file for complete search history.

(56) References Cited

U.S. PATENT DOCUMENTS 4,051,745 A * 10/1977 Ishikawa ............ F16H 55/0826
  74/462
4,922,781 A * 5/1990 Peiji ........................ F16H 1/32
  418/171

(Continued)

FOREIGN PATENT DOCUMENTS

JP   S46-24731        8/1971
JP   S48-88369 A     11/1973

(Continued)

OTHER PUBLICATIONS

The International Search Report (ISR) for PCT/US2016/028554 dated Jul. 25, 2016, pp. 1-3.

(Continued)

*Primary Examiner* — Dirk Wright
(74) *Attorney, Agent, or Firm* — McDonnell Boehnen Hulbert & Berghoff LLP

(57) ABSTRACT

An apparatus includes a ring gear having a plurality of gear teeth, where each of the plurality of gear teeth of the planet gear has a partial cycloid profile, and a planet gear rotatable within the ring gear, where the planet gear has a plurality of gear teeth, and each of the plurality of gear teeth of the planet gear has a partial cycloid profile. The total number of gear teeth of the planet gear is smaller than the total number of gear teeth of the ring gear. The gear teeth of the planet gear operatively mesh with corresponding gear teeth of the ring gear. The total number of gear teeth of the planet gear provides each gear tooth of the planet gear with a bending strength and a compressive strength such that the bending strength and the compressive strength differ by less than a predetermined amount.

17 Claims, 13 Drawing Sheets

(56) References Cited

U.S. PATENT DOCUMENTS

| | | | | |
|---|---|---|---|---|
| 5,163,826 A * | 11/1992 | Cozens | | F04C 2/084 |
| | | | | 29/893 |
| 5,429,556 A * | 7/1995 | Ishida | | F16H 1/32 |
| | | | | 475/180 |
| 5,468,193 A * | 11/1995 | Yamaguchi | | F16H 1/32 |
| | | | | 419/37 |
| 5,707,310 A * | 1/1998 | Maeguchi | | F16H 1/32 |
| | | | | 475/162 |
| 7,081,063 B2 * | 7/2006 | Hori | | F16H 1/32 |
| | | | | 475/180 |
| 7,410,028 B2 * | 8/2008 | Chikaraishi | | B62D 5/006 |
| | | | | 180/402 |
| 7,812,600 B2 * | 10/2010 | Ito | | B60N 2/0232 |
| | | | | 250/231.13 |
| 8,016,356 B2 * | 9/2011 | Mitsuhashi | | B60N 2/2252 |
| | | | | 297/366 |
| 9,091,338 B2 * | 7/2015 | O-oka | | F16H 55/08 |
| 9,534,663 B2 * | 1/2017 | Hirota | | F16D 28/00 |
| 9,657,813 B2 * | 5/2017 | Tesar | | F16H 1/32 |
| 9,783,262 B2 * | 10/2017 | Dubose | | B62M 6/55 |
| 9,915,319 B2 * | 3/2018 | Tesar | | H02K 7/116 |
| 9,927,005 B2 * | 3/2018 | Hvass | | F16H 1/32 |
| 2001/0046919 A1 | 11/2001 | Haglike | | |
| 2007/0168081 A1 * | 7/2007 | Shin | | B25J 9/08 |
| | | | | 700/245 |
| 2009/0078066 A1 | 3/2009 | Schuler | | |
| 2013/0217530 A1 * | 8/2013 | Tesar | | F16H 1/28 |
| | | | | 475/149 |
| 2013/0331217 A1 * | 12/2013 | Kobayashi | | B60K 6/365 |
| | | | | 475/5 |
| 2014/0018203 A1 | 1/2014 | Huang et al. | | |
| 2017/0138228 A1 * | 5/2017 | Miyachi | | F01L 1/352 |
| 2017/0197503 A1 * | 7/2017 | Yukishima | | B60K 7/00 |
| 2017/0204939 A1 * | 7/2017 | Tesar | | F16H 1/32 |

FOREIGN PATENT DOCUMENTS

| | | |
|---|---|---|
| JP | S50-14307 | 5/1975 |
| JP | 2005-076716 | 3/2005 |

OTHER PUBLICATIONS

Written Opinion of the International Searching Authority for PCT/US2016/028554 dated Jul. 25, 2016, pp. 1-14.

* cited by examiner

DRIVES WITH PARTIAL CYCLOID TEETH PROFILE

CROSS REFERENCE TO RELATED APPLICATION

The present application claims priority to U.S. Provisional patent application No. 62/152,484, filed on Apr. 24, 2015, and entitled "Drives with Partial Cycloid Teeth Profile," which is herein incorporated by reference as if fully set forth in this description.

GOVERNMENT LICENSE RIGHTS

This invention was made with government support under Contract No. W31P4Q-13-C-0046 awarded by the United States Army. The government has certain rights in the invention.

BACKGROUND

A transmission is a machine that converts the speed and torque from power source to a different speed and torque provided to an output, where the product of speed and torque on the input equals the product of the speed and torque on the output, less any power inefficiencies in the transmission. The term "transmission" may refer generally to a gearbox that uses gears and gear trains to provide speed and torque conversions from a rotating power source to another device. Industrial machinery, medical robotics, and domestic electronics may utilize such transmissions. Selecting or designing a transmission involves considering multiple factors. Example factors include load capacity, gear ratio, and cost.

SUMMARY

The present disclosure describes embodiments that relate to systems and apparatuses associated with drives with partial cycloid teeth profile.

In one aspect, the present disclosure describes an apparatus. The apparatus includes a ring gear having an open annular space and a plurality of gear teeth disposed on an interior peripheral surface thereof. Each of the plurality of gear teeth of the planet gear has a partial cycloid profile, and the ring gear is fixed. The apparatus also includes a planet gear rotatable within the open annular space of the ring gear. The planet gear has a plurality of gear teeth on an exterior periphery thereof, and each of the plurality of gear teeth of the planet gear has a partial cycloid profile. The planet gear has a total number of gear teeth and the ring gear has a total number of gear teeth, with the total number of gear teeth of the planet gear being smaller than the total number of gear teeth of the ring gear. The gear teeth of the planet gear operatively mesh with corresponding gear teeth of the ring gear. The total number of gear teeth of the planet gear provides each gear tooth of the planet gear with a bending strength and a compressive strength such that the bending strength and the compressive strength differ by less than a predetermined amount.

In another aspect, the present disclosure describes a cycloid drive. The cycloid drive includes an input shaft and a bearing eccentrically mounted to the input shaft. The cycloid drive also includes a ring gear having an open annular space and a plurality of gear teeth disposed on an interior peripheral surface thereof. Each of the plurality of gear teeth of the planet gear has a partial cycloid profile, and the ring gear is fixed. The cycloid drive also includes a planet gear mounted to the eccentrically mounted bearing and rotatable within the open annular space of the ring gear. The planet gear has a plurality of gear teeth on an exterior periphery thereof, and each of the plurality of gear teeth of the planet gear has a partial cycloid profile. The planet gear rotates eccentrically with respect to rotation of the input shaft. The planet gear has a total number of gear teeth and the ring gear has a total number of gear teeth, with the total number of gear teeth of the planet gear being smaller than the total number of gear teeth of the ring gear. The gear teeth of the planet gear operatively mesh with corresponding gear teeth of the ring gear. The total number of gear teeth of the planet gear provides each gear tooth of the planet gear with a bending strength and a compressive strength such that the bending strength and the compressive strength differ by less than a predetermined amount.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Selecting or designing a transmission for a particular application involves considering multiple factors. Example factors include load capacity, gear ratio, and cost Transmission systems could be heavy if a large load capacity is required. On the other hand, small transmission systems tend to have a small load capacity. Further, transmission systems tend to be expensive if high performance, defined by parameters such as efficiency, backlash, etc., is needed. Hence, a transmission system that increase load capacity for a given volume and reduce the cost of manufacturing is desired.

A cycloid drive or cycloid speed reducer is a mechanism for reducing the speed of an input shaft by a certain ratio. When compared to other similar speed reducers, cycloid drives are capable of relatively high speed reduction ratios in compact sizes, high stiffness and load capacity, low inertia, and little to no backlash. However, load capacity of cycloid drives may be limited by mechanical factors such as wear and tear. Additionally, as described below, cycloid drives involve eccentric gear systems, and compensating for the eccentricity of the gear systems may involve using a large number of parts along with requiring precision manufacturing techniques.

Disclosed herein are gear systems that improve load capacity of cycloid drives by using gear teeth that have a partial cycloid profile. Further, the disclosed systems utilize configurations having a reduced number of parts to harvest the output of the cycloid and compensate for inherent eccentricity of cycloid drives.

II. CYCLOID GEARS

Figure 1:
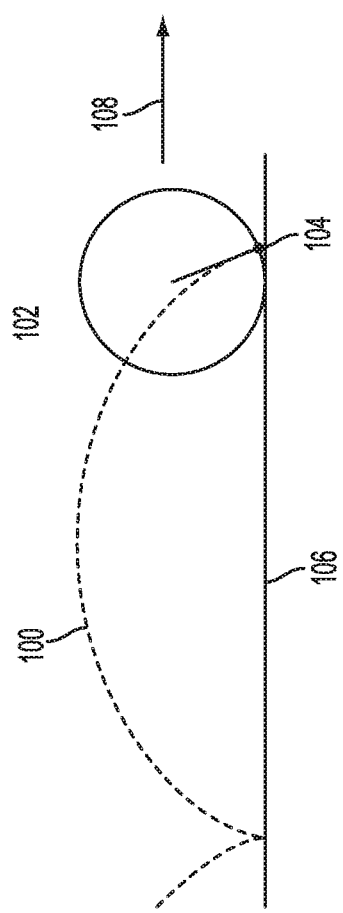
FIG. 1 illustrates a cycloid generated by a rolling circle, in accordance with an example implementation.

A cycloid is the curve traced by a point on a rim of a circular wheel as the wheel rolls along a straight line without slippage. FIG. 1 illustrates a cycloid 100 generated by a rolling circle 102, in accordance with an example implementation. A point 104 on a rim of the circle 102 traces a curve, the cycloid 100, as the circle 102 moves along a surface 106 in a direction of arrow 108.

A cycloidal gear has a cycloid profile rather than an involute gear profile used for most other gears. Teeth of cycloid gears have the shape of cycloids obtained by rolling (without sliding) an imaginary small circle on a circumference of a main circle. A curve traced by a virtual point fixed on a small circle forms a cycloid. If the small circle rolls outside of the main circle, its point will trace an epicycloid. If the point rolls inside the main circle, the curve will be a hypocycloid.

Figure 2A:
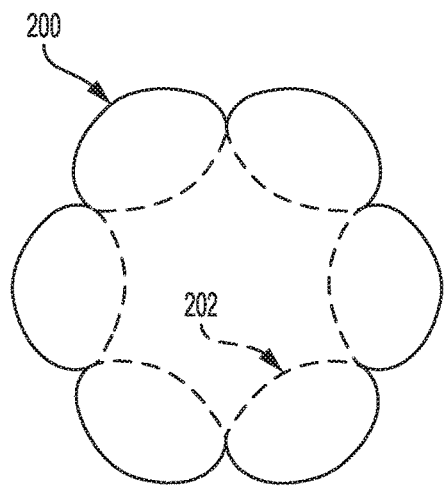
FIG. 2A illustrates an epicycloid and a hypocycloid obtained by rolling a small circle on a circumference of a bigger circle, in accordance with an example implementation.
Figure 2B:
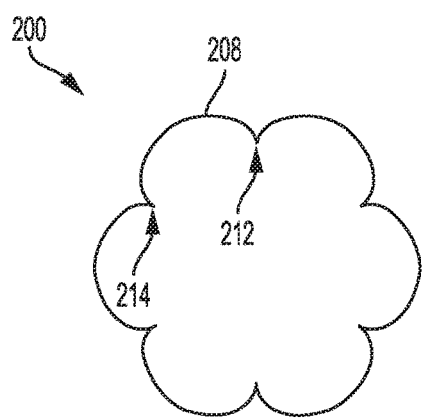
FIG. 2B illustrates the epicycloid of FIG. 2A separately, in accordance with an example implementation.
Figure 2C:
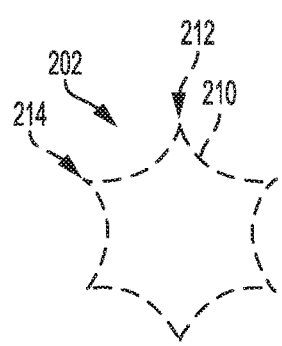
FIG. 2C illustrates the hypocycloid of FIG. 2A separately, in accordance with an example implementation.

FIG. 2A illustrates an epicycloid 200 and a hypocycloid 202 obtained by rolling a small circle on a circumference of a bigger circle, in accordance with an example implementation. The epicycloid 200 is shown as a solid line, whereas the hypocycloid 202 is shown as a dashed line. The epicycloid 200 is traced by a point of a small circle, when it rolls outside the bigger circle, and the hypocycloid 202 is traced by the point when it rolls inside the bigger circle. FIG. 2B illustrates the epicycloid 200 separately and FIG. 2C illustrates the hypocycloid 202 separately, in accordance with an example implementation.

Figure 2E:
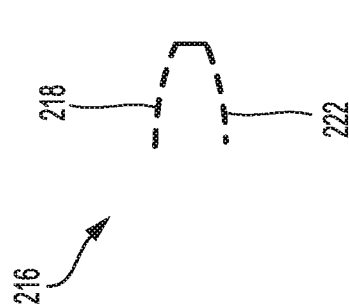
FIG. 2E illustrates a gear tooth with a partial cycloid profile, in accordance with an example implementation.
Figure 2D:
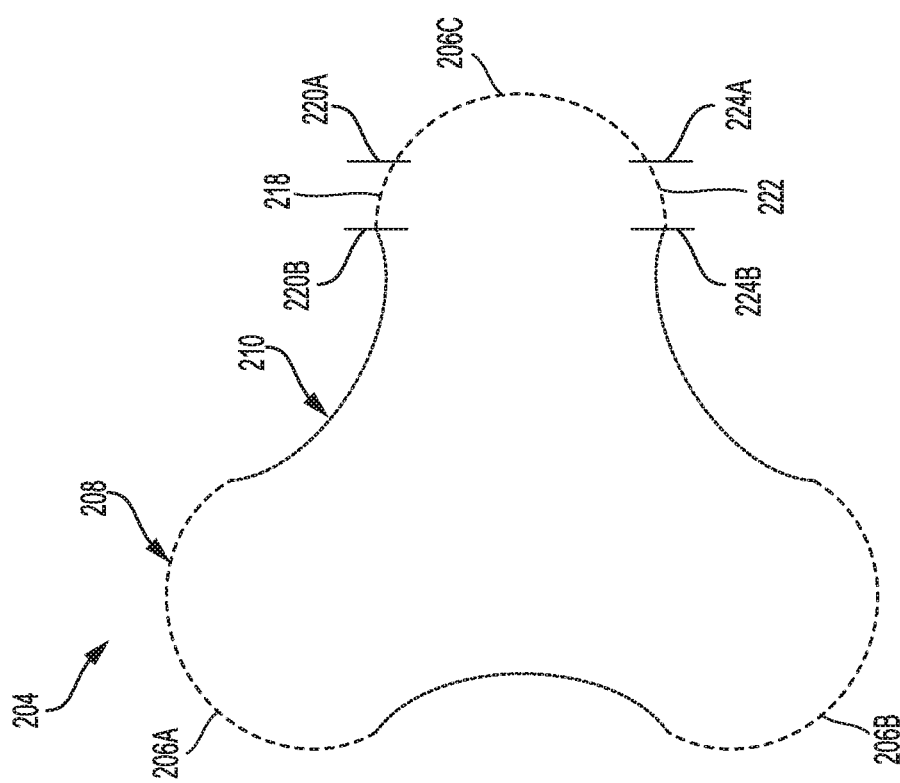
FIG. 2D illustrates a cycloid gear with three teeth having a full cycloid profile, in accordance with an example implementation.

A cycloid gear can be constructed by interleaving the epicycloid 200 with the hypocycloid 202 at their intersection points (on the main circle). FIG. 2D illustrates a cycloid gear 204 with three teeth 206A, 206B, and 206C having a full cycloid profile, in accordance with an example implementation. Three teeth are shown in FIG. 2D as an example for illustration, and a smaller or larger number of teeth could be used.

The cycloid gear 204 is constructed by interleaving portions of the epicycloid 200, such as portion 208 with portions of the hypocycloid 202 such as portion 210 at their intersection points such as point 212. The resulting teeth 206A, 206B, and 206C are referred to as having a full cycloid profile because the portions taken from the epicycloid 200 and the hypocycloid 202 are full segments between intersection points between the epicycloid 200 and the hypocycloid 202. For instance, the portion 208 is a full segment of the epicycloid 200 between the intersection point 212 and intersection point 214 with the hypocycloid 202.

As described below, the load capacity of a cycloid drive may be enhanced by using a cycloid gear with teeth having a partial cycloid profile. FIG. 2E illustrates a gear tooth 216 with a partial cycloid profile, in accordance with an example implementation. The gear tooth 216 with a partial cycloid profile can be constructed by augmenting segments of the full cycloid profile. For instance, a segment 218 shown in FIG. 2D between lines 220A and 220B could be augmented with a segment 222 between lines 224A and 224B. Thus, the resulting tooth 216 has a partial cycloid profile instead of the full cycloid profile of the teeth 206A-C.

Using teeth such as the tooth 216 having a partial cycloid profile facilitates making cycloid gears having more numerous, but thinner gear teeth, as described below with respect to FIGS. 4A-4D. Advantages of using such gears are described below with respect to FIG. 5.

III. EXAMPLE CYCLOID DRIVE SYSTEMS

Figure 3A:
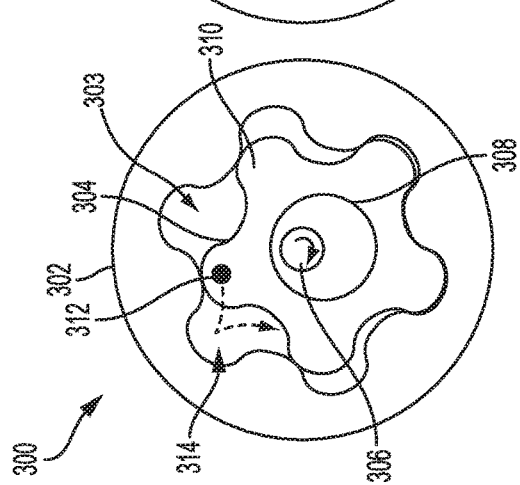
FIGS. 3A, 3B, 3C, 3D, 3E, and 3F illustrate operation of a cycloid drive, in accordance with an example implementation.
Figure 3B:
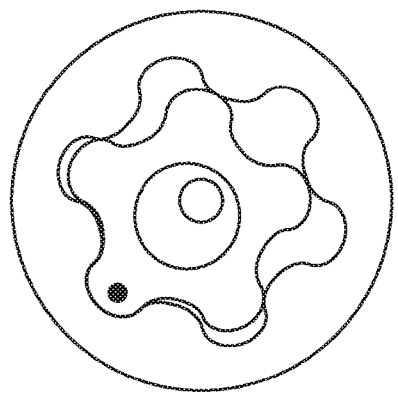
Figure 3C:
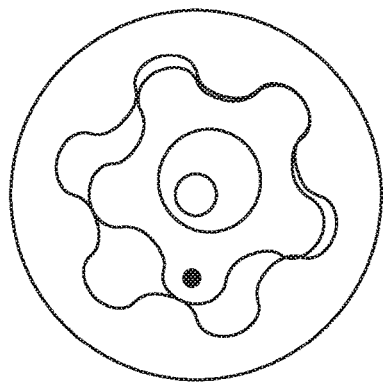
Figure 3E:
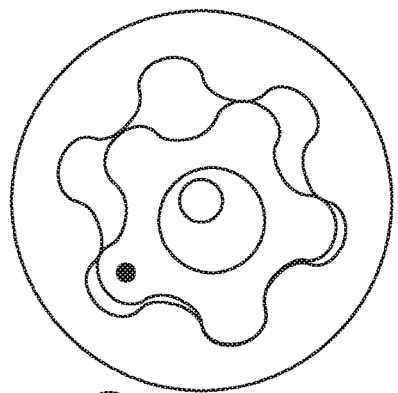
Figure 3D:
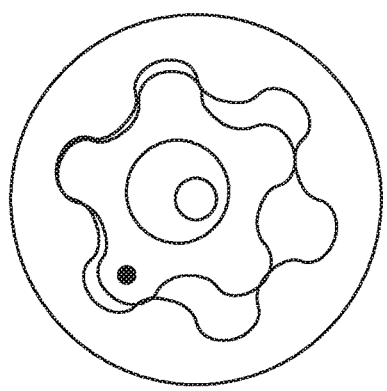
Figure 3F:
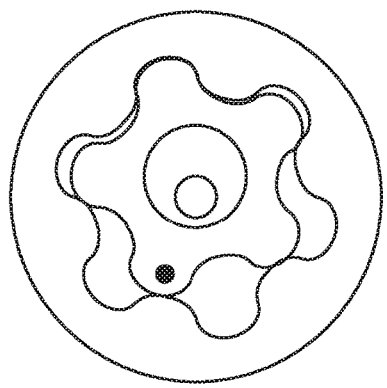

FIGS. 3A-3F illustrate operation of a cycloid drive 300, in accordance with an example implementation. As shown in FIG. 3A, the cycloid drive 300 includes (i) a ring gear 302 having an open annular space 303, (ii) a planet gear 304 rotatable within the open annular space 303 of the ring gear 302, (iii) an input shaft 306, which is concentric with the ring gear 302, and (iv) an eccentric drive member 308, which is coupled to the input shaft 306 and the planet gear 304.

As shown in FIG. 3A, and as an example for illustration, the planet gear 304 has five teeth or lobes, such as tooth 310 disposed on an exterior periphery of the planet gear 304, whereas the ring gear 302 has six teeth or lobes disposed on an interior peripheral surface of the ring gear 302. Thus, a number of gear teeth of the planet gear 304 is smaller than a number of gear teeth of the ring gear 302, and the gear teeth of the planet gear 304 operatively mesh with corresponding gear teeth of the ring gear 302. The terms "lobes" and "teeth" are used interchangeably in this disclosure.

The input shaft 306 is rotated in the direction of a solid arrow shown in FIG. 3A (i.e., clockwise direction). The input shaft 306 is coupled to the eccentric drive member 308, and thus imparts an eccentric motion to the planet gear 304. This is illustrated by a point marker 312 and a dashed arrow 314. As the input shaft 306 is rotated, FIGS. 3B-3F illustrate how the point marker 312 moves. The locus of the point marker 312 is illustrated by the dashed arrow 314. This eccentric motion is minimized or eliminated by an output mechanism prior to harvesting the output. The output mechanism is not illustrated in FIGS. 3A-3F, but example output mechanism will be described below.

Generally, load capacity of the cycloid drive 300 depends on bending strength and the compressive strength of each lobe of the planet gear 304 as it meshes with the lobes of the ring gear 302. In other words, the load capacity of the cycloid drive 300 is limited by the stresses induced by bending loads acting on the teeth. The load capacity is also limited by the Hertzian contact stresses where the planet lobes contact the ring gear lobes.

To improve load capacity of a cycloid drive, disclosed herein is a cycloid drive with a larger number of teeth that are smaller in size compared to teeth of the cycloid drive 300, but of the same gear ratio as the cycloid drive 300. As mentioned above with respect to FIG. 2E, to increase the number of teeth and make them smaller, segments of the full cycloidal profile could be used to make the teeth. In other words, smaller teeth may be made using segments of the full cycloid profile. A gear tooth that uses a segment of the full cycloid profile may be referred to as a partial cycloid tooth. Height of a partial cycloid tooth may be made as small as desired. This type of tooth profile has the advantage of increasing the contact stress load capacity of the cycloid drive, i.e., by increasing the number of contact points loaded in compression, and thus increasing the compressive strength of cycloid drive.

Figure 4B:
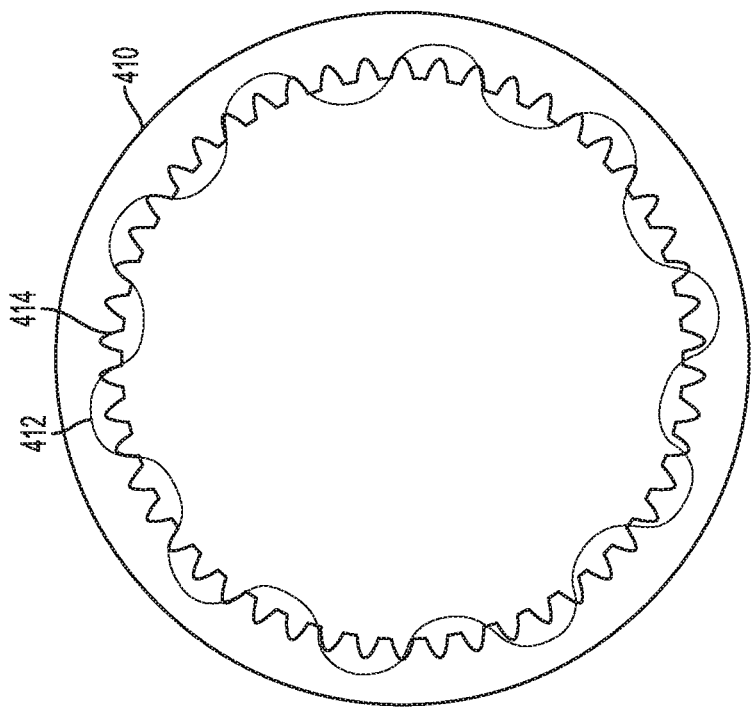
FIGS. 4A, 4B, 4C, and 4D illustrate a cycloid drive with partial cycloid teeth, in accordance with an example implementation.
Figure 4A:
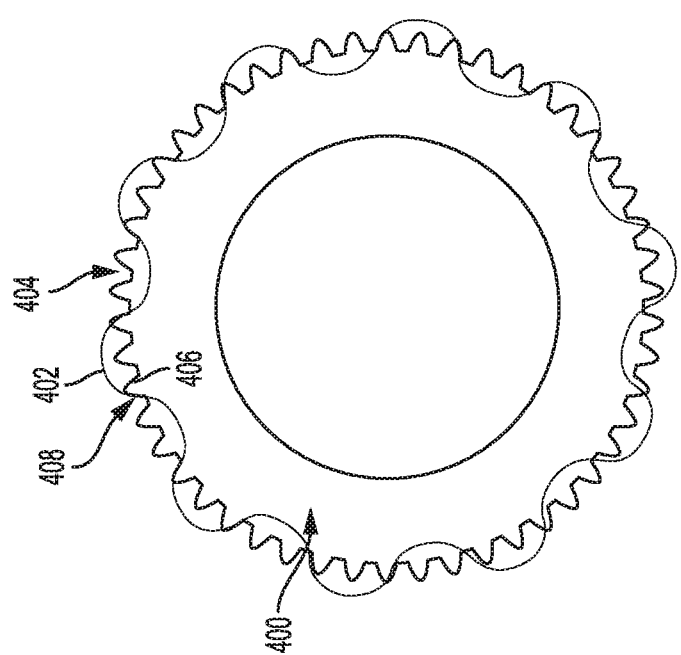

FIGS. 4A-4D illustrate a cycloid drive with partial cycloid teeth, in accordance with an example implementation. FIG. 4A shows a planet gear 400 with large lobes or teeth, which is similar to the planet gear 304. One such tooth is tooth 402. Also shown in FIG. 4A is another planet gear 404 that has smaller teeth, such as tooth 406. The profile of teeth of the planet gear 404 is a segment of the full cycloidal tooth, i.e., partial cycloid profile, thus enabling the planet gear 404 to have a larger number of teeth.

As shown in FIG. 4A, the shape of the profile of smaller teeth matches the shape of a segment of the larger teeth. For instance, portion labeled 408 is common to the smaller tooth 406 and the larger tooth 402. Thus, while the tooth 402 is a full cycloid tooth, the tooth 406 is a partial cycloid tooth, whose profile is a segment (e.g., similar to the segments 218 and 222) of the profile of the tooth 402.

The teeth on a ring gear may be adjusted in a similar manner. FIG. 4B shows a ring gear 410 that could have full cycloid gear teeth such as gear tooth 412 to match full cycloid gear teeth such as the tooth 402 of the planet gear 400. Alternatively, the ring gear 410 could have partial cycloid gear teeth such as gear tooth 414 to match partial cycloid gear teeth such as the tooth 406 of the planet gear 404.

Figure 4D:
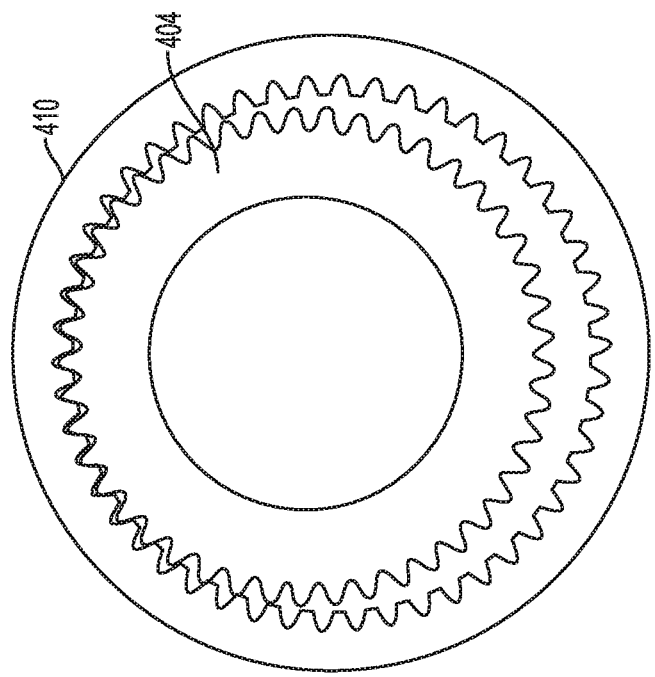
Figure 4C:
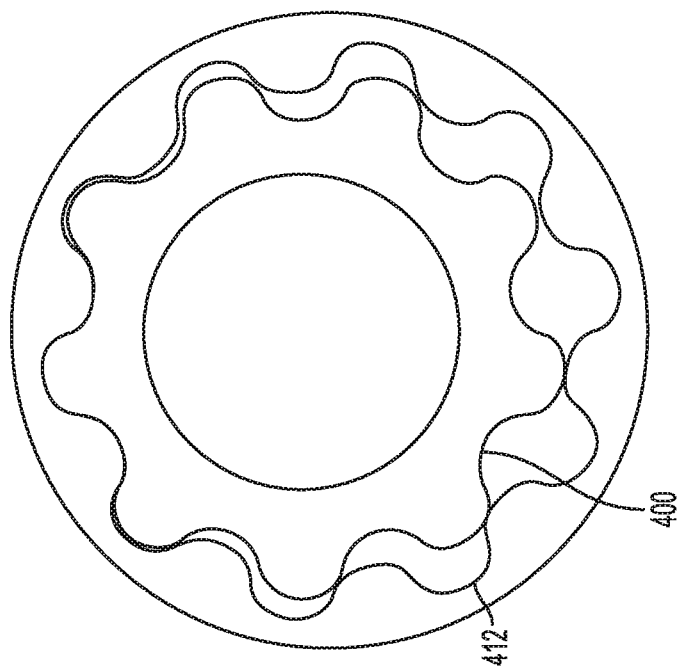

FIG. 4C illustrates the planet gear 400 and the ring gear 410 where each gear has full cycloid teeth, whereas FIG. 4D illustrates the planet gear 404 and the ring gear 410 where each gear has partial cycloid teeth. The teeth may be made as small as desired by using partial cycloid profiles instead of a full cycloid profile. Using partial cycloid teeth allows for using a larger number of smaller teeth, which improves load capacity of the cycloid drive as described next.

Load capacity of the cycloid drive may be increased by matching the bending strength with the compressive strength of the gear teeth. To match the bending strength and the compressive strength, thickness of a tooth may be reduced, while increasing the number of teeth. Reducing thickness of the tooth reduces the bending strength load capacity of the drive. On the other hand, increasing the number of teeth increases the compressive strength load capacity of the drive as the load is now distributed over a larger number of teeth. For example, the thickness and the number of teeth may be adjusted such that each tooth has a bending strength and a compressive strength that differ by less than a predetermined amount (e.g., differ by less than by 5%, differ by less than 10%, or differ by less than some other amount). Matching the bending strength and compressive strength of the gear teeth in this way may maximize or increase the load capacity of the cycloid drive.

Figure 5:
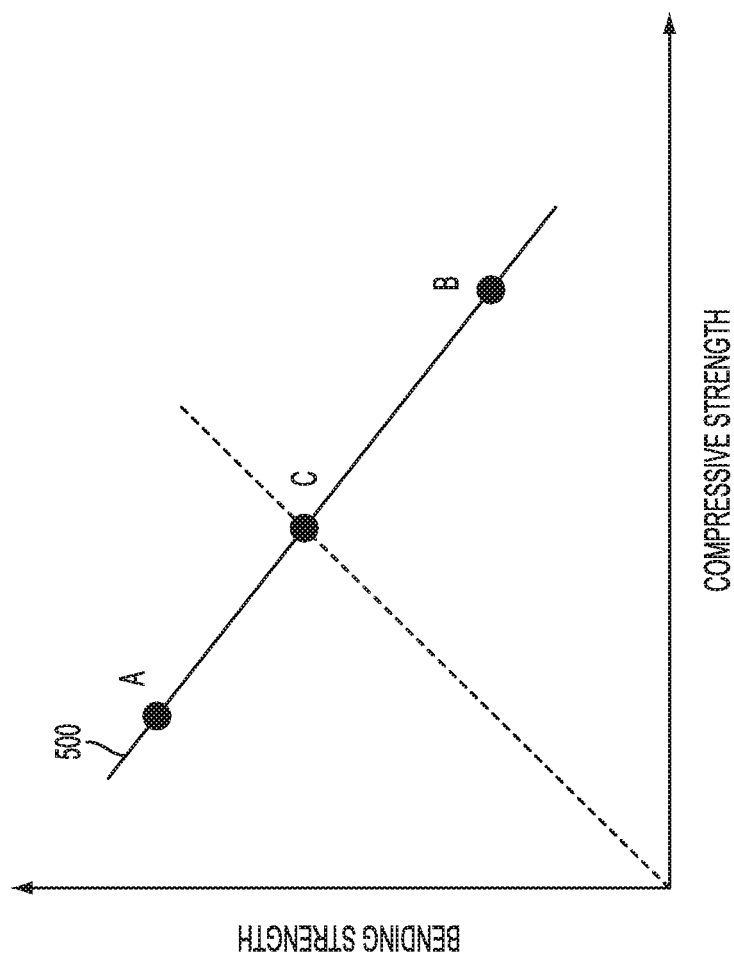
FIG. 5 illustrates the effect of using partial cycloid teeth on load capacity, in accordance with an example implementation.

FIG. 5 illustrates the effect of using partial cycloid teeth on load capacity, in accordance with an example implementation. Solid line 500 depicts relationship between the bending strength and the compressive strength. The relationship is illustrated as linear for illustration only; however, the relationship could take other nonlinear shapes.

In determining bending stress on a gear tooth, the gear tooth could be modeled as a cantilever beam. The bending stress could thus be determined by the following simplified equation:

$$\sigma_b = \frac{W_t P_d}{FY} \qquad (1)$$

where $W_t$ is a tangential load at a tip of the tooth, $P_d$ is the diametrical pitch, F is the face width of the tooth, and Y is the dimensionless Lewis form factor.

Thus, as shown by equation (1), the bending stress on a gear tooth is inversely proportional to the Lewis form factor. The Lewis form factor generally takes into account several geometry factors, including stress concentration, and increases as the number of teeth increases. Thus, the thicker and less numerous the teeth are, the lower the Lewis factor, the lower the bending stress, and thus the higher the bending strength of the tooth, and vice versa.

The compressive stress on a gear tooth is proportional to the Hertzian contact pressure, which could be determined by the following simplified equation:

$$p = \sqrt{\frac{E^* W_t}{2\pi F \cos\phi}\left(\frac{1}{r_1} + \frac{1}{r_2}\right)} \qquad (2)$$

where p is the Hertzian contact pressure, $E^*$ is an effective modulus of elasticity, $\phi$ is pressure angle, $r_1$ and $r_2$ are the equivalent radii equal to pitch radius of each gear of two meshing gears multiplied by sin (φ). The pressure angle φ is the angle between the tooth face and the gear wheel tangent. In other words, it is the angle at a pitch point between the line of pressure (which is normal to the tooth surface) and the plane tangent to the pitch surface. The pressure angle indicates the direction normal to the tooth profile.

As indicated by equation (2), the compressive stress on a gear tooth is inversely proportional to cosine of the pressure angle. The pressure angle is larger for bigger and thicker teeth, while smaller teeth are characterized by a reduced pressure angle. Thus, the thicker the tooth, the larger the pressure angle, the higher the compressive stress, and thus the lower the compressive strength of the tooth. Also, thicker less numerous teeth indicate a decreased compressive strength as the load is distributed over a smaller number of teeth.

Therefore, a thick or full cycloid tooth (e.g., the tooth 402) may be represented by points such as point A on the line 500 of FIG. 5. At point A, the compressive strength is low, whereas the bending strength is high. On the other hand, points such as point B represent low bending strength and high compressive strength. Both of these two operating points A and B represent a reduced load capacity. The load capacity of the drive is limited by whichever of the compressive strength and bending strength is lower.

To improve the load capacity of the cycloid drive, the bending strength and the compressive strength should be more balanced such that they are equal or within a threshold value of each other. This is depicted by point C. Points such as C are achieved by reducing the tooth thickness and increasing the number of teeth as illustrated by the planet gear 404 having the gear tooth 406 and the ring gear 410 having gear teeth such as the tooth 414 (as opposed to the tooth 412). The configuration represented by the planet gear 404 and the ring gear 410 having gear teeth such as tooth 414 aims to achieve operating points such as point C.

In addition to the improved drive load capacity, another advantage of the partial cycloid teeth is that the effective pressure angle between the planet gear and the ring gear is reduced, as is the sliding distance. Reducing sliding distance and pressure angle may increase the efficiency of the cycloid drive.

Figure 6A:
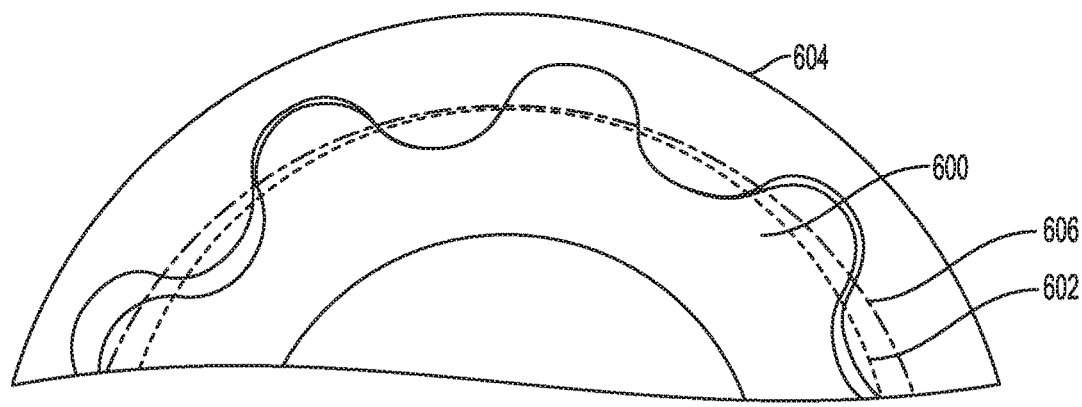
FIG. 6A illustrates rolling contact diameter, in accordance with an example implementation.

The propensity of the gears to slide may be depicted by an imaginary line called the "rolling contact diameter." FIG. 6A illustrates rolling contact diameter, in accordance with an example implementation. The rolling contact diameter for a planet gear 600 is shown by a line 602, and the rolling contact diameter for a ring gear 604 is shown by a line 606. The further away the point of contact between the gears is from the rolling contact diameter, the larger the velocity with which the gears are sliding across one another during meshing. When the teeth contact precisely at the rolling contact diameters, only rolling contact occurs, and the teeth do not slide relative to each other.

The amount of sliding loss is reduced if the cycloid drive has partial cycloid teeth, and the rolling contact diameter passes through the cycloid segments of the partial cycloid teeth. Particularly, the sliding loss is minimized if the rolling contact diameter is centered in, or passes through a middle point of, the cycloid segments of the partial cycloid teeth. Thus, to reduce sliding loss, the number of gear teeth should be selected such that the rolling contact diameter passes through, or within a threshold distance from, the midpoint of the cycloidal segment. The threshold distance may depend on the size of the tooth and the application in which the cycloid drive is used.

Figure 6B:
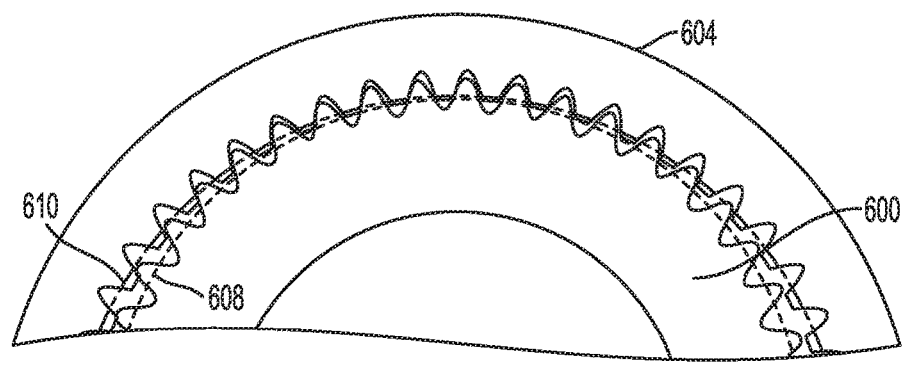
FIG. 6B illustrates a cycloid drive with rolling contact diameter passing through a midpoint of cycloid segments of partial cycloid teeth, in accordance with an example implementation.

FIG. 6B illustrates a cycloid drive with rolling contact diameter passing through a midpoint of cycloid segments of partial cycloid teeth, in accordance with an example implementation. In FIG. 6B, the planet gear 600 and the ring gear 604 are shown with numerous, partial cycloid teeth, as opposed to the full cycloid teeth shown in FIG. 6A. As illustrated in FIG. 6B, rolling contact diameters 608 and 610 of the planet gear 600 and the ring gear 604, respectively, pass through the midpoint of the cycloid segments of the teeth. Thus, the meshing teeth tend to slide less and have a minimum pressure angle. Efficiency of the cycloid drive is therefore increased.

V. COMPENSATING FOR ECCENTRICITY

As mentioned above, a planet gear of cycloid drives is affixed or coupled to an eccentric shaft. An output shaft of the cycloid drive is coupled to the planet gear of the cycloid drive, and therefore the output shaft has eccentric motion and displaces perpendicular to the gear rotational axis. In order to transmit a concentric angular rotation, the displacement has to be removed.

Figure 7:
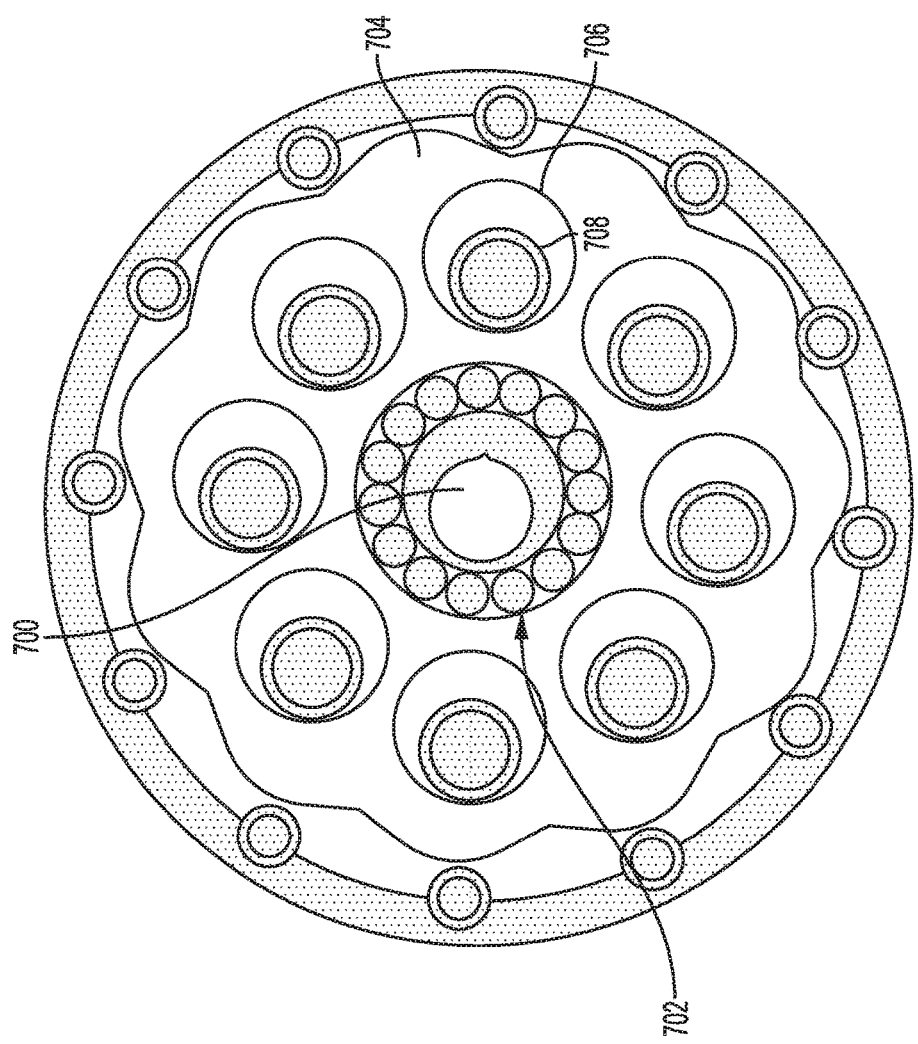
FIG. 7 illustrates a mechanism that compensates for eccentric motion of an output shaft of a cycloid drive, in accordance with an example implementation.

FIG. 7 illustrates a mechanism that compensates for eccentric motion of an output shaft of a cycloid drive, in accordance with an example implementation. An input shaft 700 is coupled to an eccentrically mounted bearing 702. The bearing 702 drives a cycloidal disk (planet gear) 704. The cycloidal disk 704 has a number of holes such as hole 706. These holes provide surfaces for output shaft rollers, such as output shaft roller 708, to roll thereon. The output shaft rollers are coupled to an output shaft (not shown in FIG. 7). Radius of the a hole, such as the hole 706, is larger than radius of a corresponding output shaft roller, such as the roller 708, by the amount of eccentricity.

With this configuration, as the input shaft 700 is rotated, due to the eccentricity of the bearing 702, the cycloid disk 704 rotates in an eccentric manner. As the cycloid disk 704 rotates, it applies force on the output shaft rollers, e.g., the output shaft roller 708, causing the output shaft rollers to rotate. Due to the holes (e.g., the hole 706) being larger than the output shaft rollers (e.g., the output shaft roller 708) by the amount of eccentricity, the eccentricity is removed and the output shaft is imparted with a circular, non-eccentric motion.

The mechanism shown in FIG. 7, however, may be characterized by having a large number of precision parts. Disclosed next are alternative mechanisms with a fewer number of parts compared to the mechanism shown in FIG. 7.

Figure 8:
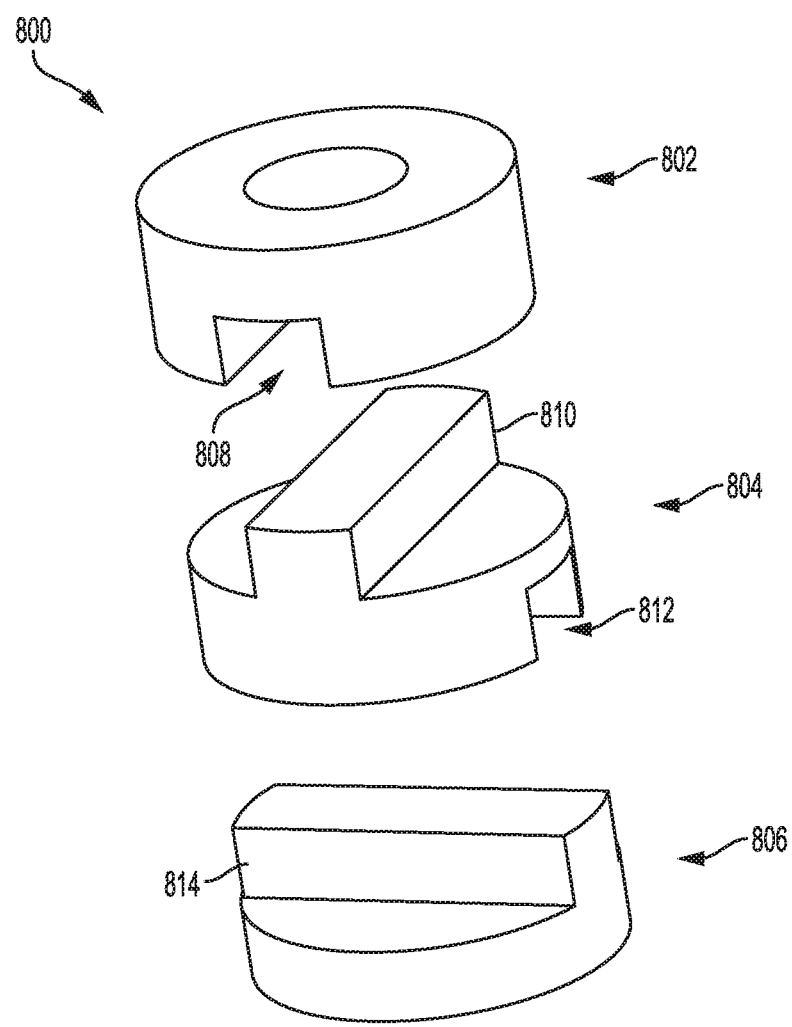
FIG. 8 illustrates a coupling used to connect two shafts that are not aligned coaxially, in accordance with an example implementation.

FIG. 8 illustrates a coupling 800 used to connect two shafts that are not aligned coaxially, in accordance with an example embodiment. The coupling 800 includes three disks 802, 804, and 806. One of the outer disks such as the disk 802 may be coupled to an input shaft while the other outer disk 806 may be coupled to an output shaft.

The middle disk 804 is coupled to both outer disks by tongue (i.e., key) and groove (i.e., keyway) configurations as shown. The terms "tongue" and "key" are used interchangeably herein. Similarly, the terms "groove" and "keyway" are used interchangeably herein.

Specifically, the outer disk 802 has a groove 808 and the middle disk 804 has a tongue 810 on a side facing the outer disk 802 and thus corresponds to and engages with the groove 808. Similarly, the middle disk 804 has a groove 812 on a side that faces the outer disk 806, and the outer disk 806 has a tongue 814 that corresponds to and engages with the groove 812. The tongue 810 is perpendicular to the groove 812. Accordingly, the middle disk 804 is configured to slide radially with respect to the outer disks 802 and 806 as the mechanism rotates.

The unaligned input and output shafts are coupled to the outer disks 802 and 806 and the middle disk 804 transfers rotation of the input shaft to the output shaft. Because the middle disk 804 is configured to slide radially with respect to the outer disks 802 and 806, the effect of the misalignment between the input and output shafts is eliminated.

The coupling 800 could be used to eliminate the eccentricity of cycloid drives. Compared to the mechanism described with respect to FIG. 7, the coupling 800 has a fewer number of parts.

As an example, referring back to FIG. 4D, one of the outer disks 802 and 806 of the coupling 800 may be coupled to the planet gear 404. The output shaft may then be coupled to the other outer disk. Thus, as the planet gear 404 rotates in an eccentric manner, the ability of the middle disk 804 to slide radially with respect to the outer disks 802 and 806 compensates for the effect of the eccentricity at the output shaft.

Figure 9A:
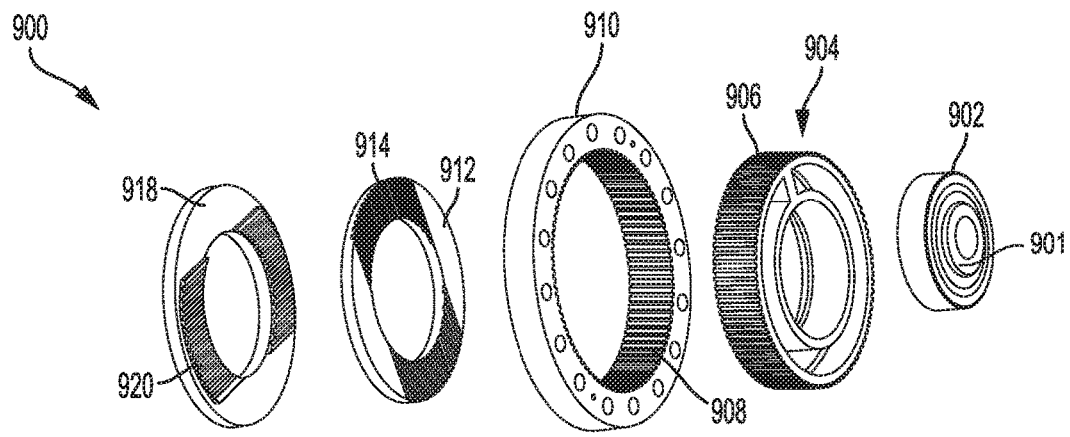
FIGS. 9A and 9B illustrate a coupling configuration to compensate for eccentricity at an output of a cycloid drive, in accordance with an example implementation.
Figure 9B:
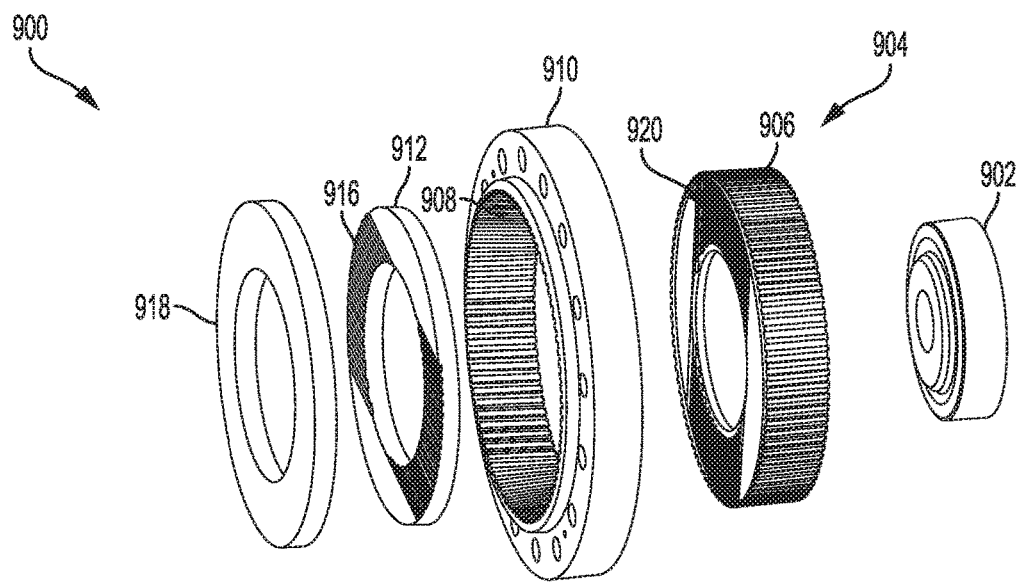

FIGS. 9A-9B illustrates a coupling configuration 900 to compensate for eccentricity at an output of a cycloid drive, in accordance with an example implementation. In this configuration, in contrast to the relatively large tongue and groove arrangement illustrated in FIG. 8, an array of smaller tongues and grooves are utilized. By using multiple parallel smaller tongues and grooves, the load capacity of the coupling increases for a given volume, thus enabling the mechanism to be more compact for a give load capacity.

FIGS. 9A-9B illustrate a cycloid drive with its planet gear and ring gear having partial cycloid teeth as described above with respect to FIGS. 4A-4D. The cycloid drive further has multiple parallel tongues and grooves for removing the eccentricity from the output of the cycloid drive.

FIG. 9A shows an exploded view of the cycloid drive with one viewing angle and FIG. 9B shows an exploded view from another viewing angle so that both sides of the components may be illustrated in the Figures. The input shaft may be coupled to component 901 at a center of the component 901 (i.e., the input shaft and the component 901 are concentric). A bearing 902 is eccentrically mounted to the input component 901. The eccentrically mounted bearing 902 is coupled to a planet gear 904. The planet gear 904 has partial cycloid teeth 906 that mesh with partial cycloid teeth 908 of a ring gear 910.

Further, as shown in FIG. 9B, the planet gear 904 operates as one of the output disks 802 and 806. The planet gear 904 has a first side that faces toward the input shaft and a second side opposite to the first side. The second side includes multiple tongues and grooves 911 as opposed to a single tongue (e.g., the tongue 814) or a single groove (e.g., the groove 808).

The configuration 900 includes an intermediate disk 912 that is equivalent to the middle disk 804 in FIG. 8. Instead of the single tongue 810 and the single groove 812 of the disk 804, the disk 912 has multiple tongues and grooves 914 and 916 on both sides of the disk. A first side of the disk 912 faces toward the planet gear 904 and has the tongues and grooves 914, whereas a second side opposite to the first side has the tongues and grooves 916. The tongues and grooves 914 are perpendicular to tongues and grooves 916.

Disk 918 is an output disk similar to either of the outer disks 802 and 806. The disk 918 has multiple tongues or groove 920 configured to engage with the tongues or grooves 916 of the disk 912. In operation, as the planet gear 904 moves in an eccentric manner, the disk 912 slides radially with respect to both the planet gear 904 and the output disk 918, and thus the eccentricity of the output is eliminated. The configuration 900 shown in FIGS. 9A-9B includes fewer parts compared to the mechanism shown in FIG. 7, and could thus be more cost effective.

Figure 10A:
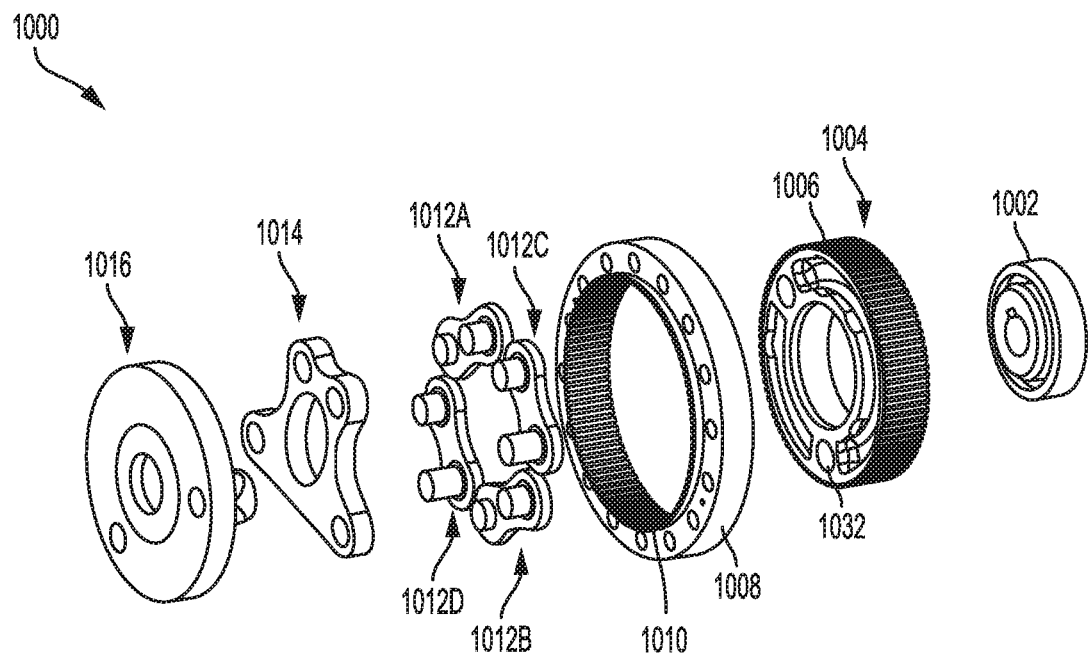
FIGS. 10A and 10B illustrate a configuration to compensate for eccentricity at an output of a cycloid drive, in accordance with an example implementation.
Figure 10B:
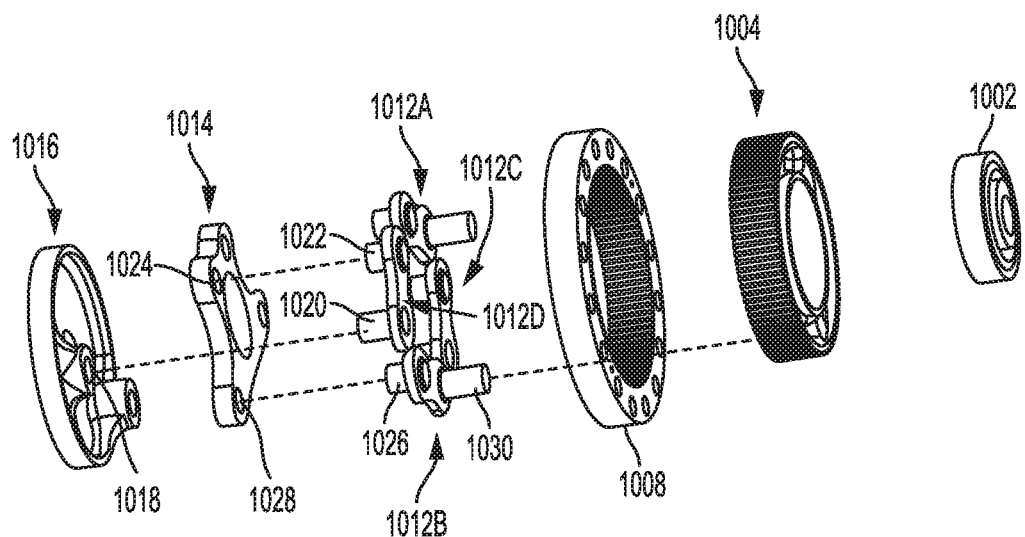

FIGS. 10A-10B illustrates a configuration 1000 to compensate for eccentricity at an output of a cycloid drive, in accordance with an example implementation. The configuration 1000 uses links to compensate for the eccentricity.

An input shaft may be coupled to an eccentrically mounted bearing 1002. The bearing 1002 is eccentric with respect to the input shaft as described in previous configurations. The configuration 1000 includes a planet gear 1004 having partial cycloid teeth 1006. A ring gear 1008 also has the partial cycloid teeth 1010. The planet gear 1004 has a first side facing toward the input shaft and a second side opposite the first side.

The configuration 1000 includes four links 1012A, 1012B, 1012C, and 1012D, each link having two pegs. More or fewer links could be used, and each link could have more or fewer pegs. The links 1012A, 1012B, 1012C, and 1012D are connected or coupled to each other and are disposed in a plane parallel to a respective plane of the planet gear 1004. The pegs of the links 1012A, 1012B, 1012C, and 1012D protrude in a direction perpendicular to the plane.

The configuration 1000 also has an intermediate member 1014 having four holes as shown. The configuration 1000 also has an output member 1016 that has two holes, such as hole 1018.

A subset the pegs of the links 1012A, 1012B, 1012C, and 1012D face toward and are coupled to the intermediate member 1014 and output member 1016, whereas another subset of pegs face toward and are coupled to the planet gear 1004.

The dashed lines in FIG. 10B illustrate how half of the pegs of the links 1012A, 1012B, 1012C, and 1012D are coupled to holes in other members. For instance, a peg 1020 of the link 1012D extends beyond the intermediate member 1014 and is coupled to the hole 1018 of the output member 1016. A peg 1022 of the link 1012D is coupled to a hole 1024 of the intermediate member 1014. A peg 1026 of the link 1012B is coupled to a hole 1028 of the intermediate member 1014. A peg 1030 of the link 1012B is coupled to a hole 1032 of the planet gear 1004. Only half the connections of the pegs with respective holes are shown to reduce visual clutter in the drawings.

Each peg is free to rotate within a corresponding hole the peg is received at or coupled thereto. As described in previous configurations, the planet gear 1004 moves about in an eccentric manner. The lengths of the links 1012A, 1012B, 1012C, and 1012D should be substantially larger than the amount of eccentricity of the planet gear 1004 so as to compensate for the eccentricity. The planet gear 1004 causes, via the pegs coupled to the planet gear 1004, the links 1012A-D and the intermediate member 1014 to move in a manner that eliminates or reduces the eccentric motion. Thus, the output member 1016 also moves about without the eccentricity. A shaft coupled to the output member would therefore rotate without eccentric motion. Similar to the configuration shown in FIGS. 9A-9B, the configuration shown in FIGS. 10A-10B includes fewer parts compared to the mechanism shown in FIG. 7, and requires fewer precision machining operations, and could thus be more cost effective.

Figure 11:
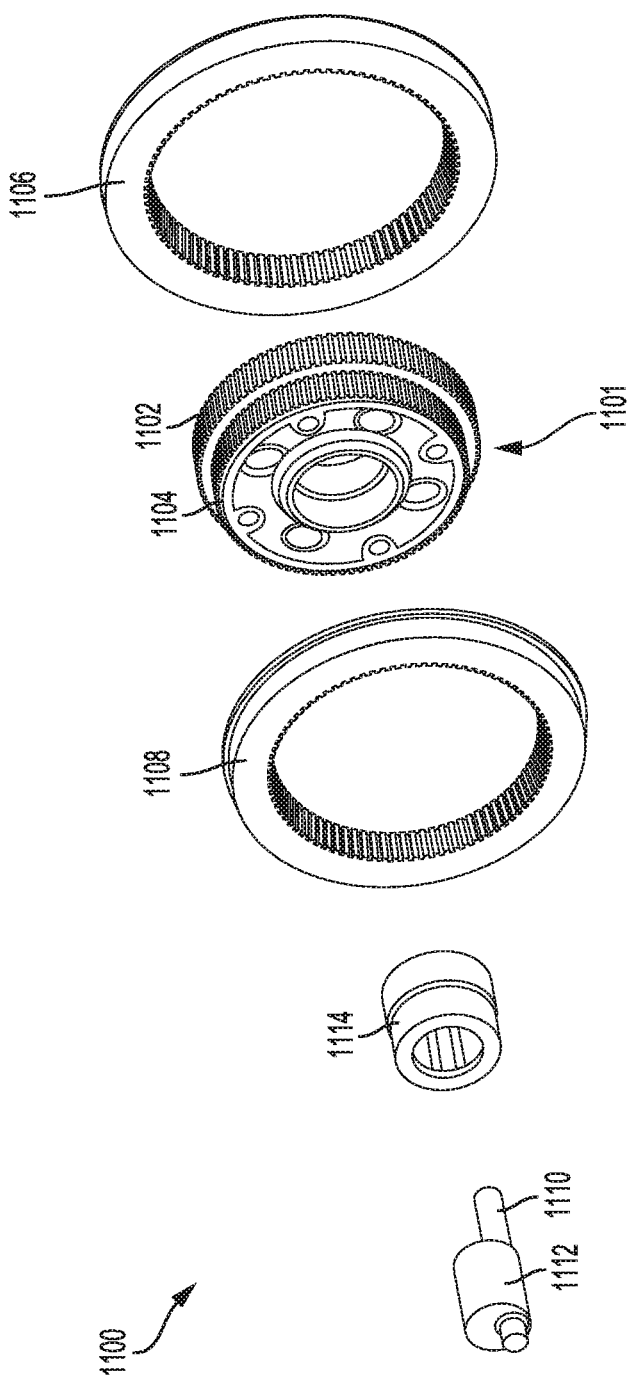
FIG. 11 illustrates another configuration to compensate for eccentricity of a cycloid drive, in accordance with an example implementation.

FIG. 11 illustrates another configuration 1100 to compensate for eccentricity of a cycloid drive, in accordance with an example implementation. While the configurations shown previously include a single planet gear, the configuration 1100 includes a compound planet gear 1101 having two planet gears 1102 and 1104. The two planet gears 1102 and 1104 are affixed to each other, and thus rotate as one unit at the same speed.

The configuration 1100 also include two corresponding ring gears 1106 and 1108, such that the planet gear 1102 meshes with the ring gear 1106 and the planet gear 1104 meshes with ring gear 1108. One of the ring gears is grounded, i.e., fixed, while the other ring gear is free to rotate, i.e., floating.

Pitch diameters of the two planet gears 1102 and 1104 are different by a small or threshold amount. For example, pitch diameter of the planet gear 1102 could be 55 millimeter (mm) and pitch diameter of the planet gear 1104 could be 50 mm. Similarly, pitch diameter of the two ring gears 1106 and 1108 are different by a small or threshold amount, but the difference in pitch diameters of the ring gears is equal to the difference in the pitch diameters of the planet gears. For example, pitch diameter of the ring gear 1106 could be 60 mm and pitch diameter of the planet gear 1108 could be 55 mm.

FIG. 11 also shows an input shaft 1110 coupled to an eccentric component 1112, which is coupled to the planet gears 1102 and 1104. A roller bearing 1114 is configured to encompass the eccentric component 1112. In operation, as the input shaft 1110 rotates, the planet gears 1102 and 1104 both move in an eccentric manner within their respective ring gears 1106 and 1108, respectively.

If the ring gear 1106 is considered as the "ground" gear (i.e., the gear that does not move), then the output may be harvested from the ring gear 1108, which is free to rotate or is floating. The arrangement of the planet gear 1104 and ring gear 1108 cancels the eccentricity of the rotation of planet gear 1102 within the ring gear 1106. Thus, the output has no eccentricity. In this configuration, a large gear ratio reduction may be obtained as the gear ratio is the product of the two gear ratios between each ring and planet pair. Further, similar to the configurations shown in FIGS. 9A-9B and FIGS. 10A-10B, the configuration shown in FIG. 11 includes fewer parts compared to the mechanism shown in FIG. 7, and could thus be more cost effective.

V. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
a ring gear having an open annular space and a plurality of gear teeth disposed on an interior peripheral surface thereof, wherein each gear tooth of the ring gear has a partial cycloid profile comprising a first segment of a lobe of a first cycloid on one side of the gear tooth of the ring gear and a second segment of the lobe of the first cycloid on an opposite side of the gear tooth of the ring gear, wherein the first and second segments are non-contiguous segments of the lobe of the first cycloid and multiple gear teeth of the ring gear fit within the lobe of the first cycloid, and wherein the ring gear is fixed; and
a planet gear rotatable within the open annular space of the ring gear, wherein the planet gear has a plurality of gear teeth on an exterior periphery thereof, wherein each gear tooth of the planet gear has a partial cycloid profile comprising a first segment of a lobe of a second cycloid on one side of the gear tooth of the planet gear and a second segment of the lobe of the second cycloid on an opposite side of the gear tooth of the planet gear, wherein the first and second segments are non-contiguous segments of the lobe of the second cycloid and multiple gear teeth of the planet gear fit within the lobe of the second cycloid, wherein:
the planet gear has a total number of gear teeth and the ring gear has a total number of gear teeth, with the total number of gear teeth of the planet gear being smaller than the total number of gear teeth of the ring gear, and
the gear teeth of the planet gear operatively mesh with corresponding gear teeth of the ring gear.

2. The apparatus of claim 1, further comprising:
an input shaft;
a bearing eccentrically mounted to the input shaft, wherein the planet gear is mounted to the eccentrically mounted bearing.

3. The apparatus of claim 1, wherein the planet gear is mounted eccentrically with respect to an input shaft, and wherein the planet gear rotates eccentrically with respect to rotation of the input shaft.

4. The apparatus of claim 3, further comprising:
a first disk having a groove;
a second disk having a first side facing toward the first disk and having a tongue on the first side, wherein the tongue corresponds to, and is configured to engage with, the groove of the first disk, and wherein the second disk comprises a groove disposed on a second side of the second disk opposite to the first side, wherein the groove disposed on the second side of the second disk is perpendicular to the tongue on the first side;
a third disk having a tongue corresponding to, and configured to engage with, the groove disposed on the second side of the second disk, such that the second disk is configured to slide radially with respect to the first disk and the third disk; and
an output shaft, wherein the first disk is coupled to one of the output shaft or the planet gear and the third disk is coupled to the other of the output shaft or the planet gear.

5. The apparatus of claim 3, wherein the planet gear has a planet gear first side facing toward the input shaft and a planet gear second side opposite to the planet gear first side, wherein the planet gear second side comprises a plurality of tongues and grooves, and wherein the apparatus further comprises:
an intermediate disk having a first side facing toward the planet gear and having a plurality of grooves and tongues on the first side, wherein the plurality of grooves and tongues on the first side of the intermediate disk correspond to, and are configured to engage with, the plurality of grooves and tongues of the planet gear second side, and wherein the intermediate disk comprises a plurality of grooves and tongues disposed on a second side of the intermediate disk opposite to the first side, wherein the plurality of grooves and tongues disposed on the second side of the intermediate disk are perpendicular to the plurality of grooves and tongues on the first side; and an output disk having a plurality of grooves and tongues corresponding to, and configured to engage with, the plurality of grooves and tongues disposed on the second side of the intermediate disk, such that the intermediate disk is configured to slide radially with respect to the planet gear and the output disk.

6. The apparatus of claim 5, further comprising:
an output shaft coupled to the output disk.

7. The apparatus of claim 1, wherein the planet gear has a planet gear first side facing toward an input shaft and a planet gear second side opposite to the planet gear first side, wherein the planet gear second side comprises a plurality of holes, and wherein the apparatus further comprises:
a plurality of links connected to each other and disposed in a plane parallel to a respective plane of the planet gear, each link having one or more pegs protruding in a direction perpendicular to the plane, wherein a first subset of pegs of the plurality of links protrude toward and are received at respective holes of the plurality of holes of the planet gear second side;
an intermediate member having a plurality of holes;
an output disk having a plurality of holes, wherein the intermediate member is disposed between the plurality of links and the output disk, and wherein:
a second subset of the pegs protrude toward the intermediate member and are received at the plurality of holes of the intermediate member, and
a third subset of the pegs protrude toward the output disk, extend beyond the intermediate member, and are received at holes of the output disk, wherein each peg is free to rotate within a corresponding hole at which the peg is received.

8. The apparatus of claim 7, wherein:
the plurality of links comprises four links, each link having two pegs,
two pegs of two respective opposing links protrude toward and are received at two respective holes of the plurality of holes of the planet gear second side,
two pegs protrude toward the output disk, extend beyond the intermediate member, and are received at two respective holes on the output disk, and
four pegs protrude toward the intermediate member and are received at four respective holes of the plurality of holes of the intermediate member.

9. The apparatus of claim 3, wherein the planet gear is a first planet gear and the ring gear is a first ring gear, and wherein the apparatus further comprises:
a second ring gear that is floating and has a respective open annular space, wherein the second ring gear has a plurality of gear teeth disposed on an interior peripheral surface thereof, and wherein each of the plurality of gear teeth of the second ring gear has a partial cycloid profile;
a second planet gear rotatable within the open annular space of the second ring gear, wherein the second planet gear has a plurality of gear teeth on an exterior periphery thereof, wherein each of the plurality of gear teeth of the second planet gear has a partial cycloid profile, wherein the second planet gear has a smaller diameter relative to the first planet gear and is affixed to the first planet gear, such that the first planet gear and the second planet gear form a compound gear configured to rotate at the same speed; and
an output shaft coupled to the floating second ring gear.

10. The apparatus of claim 9, wherein a difference between a pitch diameter of the first ring gear and a pitch diameter of the second ring gear is equal to a respective difference between a pitch diameter of the first planet gear and a pitch diameter of the second planet gear.

11. A cycloid drive comprising:
an input shaft;
a bearing eccentrically mounted to the input shaft;
a ring gear having an open annular space and a plurality of gear teeth disposed on an interior peripheral surface thereof, wherein each gear tooth of the ring gear has a partial cycloid profile comprising a first segment of a lobe of a first cycloid on one side of the gear tooth of the ring gear and a second segment of the lobe of the first cycloid on an opposite side of the gear tooth of the ring gear, wherein the first and second segments are non-contiguous segments of the lobe of the first cycloid and multiple gear teeth of the ring gear fit within the lobe of the first cycloid, and wherein the ring gear is fixed; and
a planet gear mounted to the eccentrically mounted bearing and rotatable within the open annular space of the ring gear, wherein the planet gear has a plurality of gear teeth on an exterior periphery thereof, wherein each gear tooth of the planet gear has a partial cycloid profile comprising a first segment of a lobe of a second cycloid on one side of the gear tooth of the planet gear and a second segment of the lobe of the second cycloid on an opposite side of the gear tooth of the planet gear, wherein the first and second segments are non-contiguous segments of the lobe of the second cycloid and multiple gear teeth of the planet gear fit within the lobe of the second cycloid, wherein:
the planet gear rotates eccentrically with respect to rotation of the input shaft,
the planet gear has a total number of gear teeth and the ring gear has a total number of gear teeth, with the total number of gear teeth of the planet gear being smaller than the total number of gear teeth of the ring gear, and
the gear teeth of the planet gear operatively mesh with corresponding gear teeth of the ring gear.

12. The cycloid drive of claim 11, further comprising:
a first disk having a groove;
a second disk having a first side facing toward the first disk and having a tongue on the first side, wherein the tongue corresponds to, and is configured to engage with, the groove of the first disk, and wherein the second disk comprises a groove disposed on a second side of the second disk opposite to the first side, wherein the groove disposed on the second side of the second disk is perpendicular to the tongue on the first side;
a third disk having a tongue corresponding to, and configured to engage with, the groove disposed on the second side of the second disk, such that the second disk is configured to slide radially with respect to the first disk and the third disk; and
an output shaft, wherein the first disk is coupled to one of the output shaft or the planet gear and the third disk is coupled to the other of the output shaft or the planet gear.

13. The cycloid drive of claim 11, wherein the planet gear has a planet gear first side facing toward the input shaft and a planet gear second side opposite to the planet gear first side, wherein the planet gear second side comprises a plurality of tongues and grooves, and wherein the cycloid drive further comprises:
- an intermediate disk having a first side facing toward the planet gear and having a plurality of grooves and tongues on the first side, wherein the plurality of grooves and tongues on the first side of the intermediate disk correspond to, and are configured to engage with, the plurality of grooves and tongues of the planet gear second side, and wherein the intermediate disk comprises a plurality of grooves and tongues disposed on a second side of the intermediate disk opposite to the first side, wherein the plurality of grooves and tongues disposed on the second side of the intermediate disk are perpendicular to the plurality of grooves and tongues on the first side; and
- an output disk having a plurality of grooves and tongues corresponding to, and configured to engage with, the plurality of grooves and tongues disposed on the second side of the intermediate disk, such that the intermediate disk is configured to slide radially with respect to the planet gear and the output disk.

14. The cycloid drive of claim 11, wherein the planet gear has a planet gear first side facing toward the input shaft and a planet gear second side opposite to the planet gear first side, wherein the planet gear second side comprises a plurality of holes, and wherein the cycloid drive further comprises:
- a plurality of links connected to each other and disposed in a plane parallel to a respective plane of the planet gear, each link having one or more pegs protruding in a direction perpendicular to the plane, wherein a first subset of pegs of the plurality of links protrude toward and are received at respective holes of the plurality of holes of the planet gear second side;
- an intermediate member having a plurality of holes;
- an output disk having a plurality of holes, wherein the intermediate member is disposed between the plurality of links and the output disk, and wherein:
  - a second subset of the pegs protrude toward the intermediate member and are received at the plurality of holes of the intermediate member, and
  - a third subset of the pegs protrude toward the output disk, extend beyond the intermediate member, and are received at holes of the output disk, wherein each peg is free to rotate within a corresponding hole at which the peg is received.

15. The cycloid drive of claim 14, wherein:
the plurality of links comprises four links, each link having two pegs,
two pegs of two respective opposing links protrude toward and are received at two respective holes of the plurality of holes of the planet gear second side,
two pegs protrude toward the output disk, extend beyond the intermediate member, and are received at two respective holes on the output disk, and
four pegs protrude toward the intermediate member and are received at four respective holes of the plurality of holes of the intermediate member.

16. The cycloid drive of claim 11, wherein the planet gear is a first planet gear and the ring gear is a first ring gear, and wherein the cycloid drive further comprises:
- a second ring gear that is floating and has a respective open annular space, wherein the second ring gear has a plurality of gear teeth disposed on an interior peripheral surface thereof, and wherein each of the plurality of gear teeth of the second ring gear has a partial cycloid profile;
- a second planet gear rotatable within the open annular space of the second ring gear, wherein the second planet gear has a plurality of gear teeth on an exterior periphery thereof, wherein each of the plurality of gear teeth of the second planet gear has a partial cycloid profile, wherein the second planet gear has a smaller diameter relative to the first planet gear and is affixed to the first planet gear, such that the first planet gear and the second planet gear form a compound gear configured to rotate at the same speed; and
- an output shaft coupled to the floating second ring gear.

17. The cycloid drive of claim 16, wherein a difference between a pitch diameter of the first ring gear and a pitch diameter of the second ring gear is equal to a respective difference between a pitch diameter of the first planet gear and a pitch diameter of the second planet gear.

* * * * *